US008813172B2

(12) United States Patent
Reus et al.

(10) Patent No.: US 8,813,172 B2
(45) Date of Patent: Aug. 19, 2014

(54) PROTECTION OF DATA IN A MIXED USE DEVICE

(75) Inventors: Edward Reus, Seattle, WA (US); Scott Field, Redmond, WA (US); Michael Joseph Healy, Redmond, WA (US); Joseph Dadzie, Redmond, WA (US); Srivatsan Parthasarathy, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 77 days.

(21) Appl. No.: 13/329,111

(22) Filed: Dec. 16, 2011

(65) Prior Publication Data

US 2013/0160072 A1 Jun. 20, 2013

(51) Int. Cl.
*G06F 21/00* (2013.01)
(52) U.S. Cl.
USPC .............. 726/1; 726/2; 726/6; 726/7; 726/26; 726/27; 707/687; 707/694
(58) Field of Classification Search
USPC .............. 726/1, 2, 6, 7, 26, 27; 707/687, 694, 707/695
See application file for complete search history.

(56) References Cited

U.S. PATENT DOCUMENTS

| 7,890,530 | B2 * | 2/2011 | Bilger et al. | 707/781 |
|---|---|---|---|---|
| 7,917,963 | B2 | 3/2011 | Goyal | |
| 8,108,923 | B1 * | 1/2012 | Satish et al. | 726/11 |
| 8,256,006 | B2 * | 8/2012 | Grzymala-Busse et al. | 726/26 |
| 8,327,451 | B2 * | 12/2012 | Duri et al. | 726/26 |
| 8,407,345 | B2 * | 3/2013 | Lim | 709/225 |
| 2002/0149614 | A1 * | 10/2002 | Biebesheimer et al. | 345/738 |
| 2005/0203870 | A1 | 9/2005 | Yamada et al. | |
| 2006/0048224 | A1 * | 3/2006 | Duncan et al. | 726/22 |
| 2007/0113287 | A1 | 5/2007 | Blumenau et al. | |
| 2009/0222882 | A1 | 9/2009 | Kabat et al. | |
| 2010/0010968 | A1 | 1/2010 | Redlich et al. | |
| 2011/0289557 | A1 | 11/2011 | Ballesteros et al. | |

OTHER PUBLICATIONS

Zhang, Xinwen, Jaehong Park, Francesco Parisi-Presicce, and Ravi Sandhu. "A logical specification for usage control." In Proceedings of the ninth ACM symposium on Access control models and technologies, pp. 1-10. ACM, 2004. [retrieved from ACM database on Mar. 25, 2013].*
Protecting Valuable Data and Managing Information Risk; Jun. 29, 2011.
Protect Corporate Data and Your Mobile Workforce from Cybercriminals; Jun. 10, 2011.
How to Turn Smartphones on for Business; Jun. 29, 2011.
Mobile Iron for Managing Mobile Devices with Corporate Data; Mar. 29, 2011.

(Continued)

*Primary Examiner* — Saleh Najjar
*Assistant Examiner* — Peiliang Pan
(74) *Attorney, Agent, or Firm* — Jim Sfekas; Kate Drakos; Micky Minhas

(57) ABSTRACT

Data management techniques are provided for handling information resources. A data management process can account for attributes of information resources by analyzing or interpreting the workspace location, source, channel and device associated with an information resource, and effectuating policies, based on the attributes. Rules govern the attribute determination and policies for access restriction to the information resource. The attributes and policies determined are tagged to the information resource and is dynamically updated based on the attributes related to the information resource within different workspaces, such as a corporate workspace and a personal workspace.

18 Claims, 10 Drawing Sheets

(56) References Cited

OTHER PUBLICATIONS

Mobile Security: Current Threats and Emerging Protective Measures; Jun. 29, 2011.

Enabling Device—Independent Mobility with Dynamic Virtual Clients; Nov. 2011.

Tyrone Grandison, et al; Elevating the Discussion on Security Management; May 21, 2007; Business-Driven IT Management, 2nd IEEE/IFIP International Workshop.

An IT Manager's Guide to Managing Personal Devices in the Enterprise; Jun. 29, 2011.

"International Search Report", Mailed Date: Jun. 2, 2013, Application No. PCT/US2012/069967, Filed date: Dec. 15, 2012, pp. 12.

* cited by examiner

PROTECTION OF DATA IN A MIXED USE DEVICE

TECHNICAL FIELD

The subject disclosure relates to controlling data and more specifically to systems and methods to control attributes and knowledge tags of data.

BACKGROUND

Devices used in the office at work and in the security of one's own home no longer have a clear separation. Employees bring devices into work, and, in turn, bring work devices home. According to estimates of at least one survey, about fifty percent of more than 3,000 workers among ten different countries operate smart phones for both work and personal use. With technology becoming increasingly personalized and accessible, a global trend is increasing towards a mixed-use world with devices that are work-home devices. As new client devices (e.g., smart phones, netbooks, palm-held digital assistants, etc.) and mobile technologies emerge, client mobility is increasing in popularity and ease, thus, enabling users to move between offices, labs, homes, and access IT environments with a multitude of different devices.

Clear advantages exist with the rapidly growing mixed-use trend of personal and work devices. However, new paths rarely arrive without new challenges. Providing smart phones to employees, for example, allows an urgent response to client requests and a potential competitive advantage over competition. What companies are realizing is that allowing employees with personally owned devices to access corporate email and other resources, increases productivity, while at a same time saving expenses by offloading cost onto the employee. On the other hand, workplace benefits are increased by when smart devices are provided to employees that extend to personal use outside the office.

Regardless of the advantages, imminent risks are present to security without attention to the dangers. For example, many companies are not even aware of the number of mobile devices (e.g., Windows Mobile, Palm, iPhone, Symbian, etc.) accessing their corporate network unauthorized. Adding to such risks, one estimated survey illustrates that in London alone at least 10,000 phones are left in the backs of taxis, every month. In addition, the British Transport Police report that approximately 45 percent of thefts on London's underground train system are of mobile phones. Furthermore, smart phones carrying data plans and other subscription data services are frequently eligible for upgrade at low or no cost. Phones are traded back to the phone companies, upgraded and replaced without attention to where the information travels. The issues raised beg the question: How long does data on smart devices remain at risk after leaving the user's control, either from a loss of the device that houses the data or a transfer of the data to a different location?

At the most basic level, enterprises of today are driven by their information assets. Any entity or person that values information obtained or created has a stake in keeping information in their control. The alternative option, to treat information itself as "out-of-sight, out-of-mind" is innate with risks that are potentially indefinite. Without a clear separation between corporate and personal data worlds with devices brought into the office, employees could easily put company data at risk, even without intending as much. As boundaries between these worlds continue to erode, investments into protecting data are unavoidable. However, as the lines between personal space and corporate space for a user's data are increasingly blending, the distinction can still be important, and thus, ways to seamlessly manage data are valuable.

The above-described deficiencies in the handling of data are merely intended to provide an overview of some of the problems of conventional systems, and are not intended to be exhaustive. Other problems with the state of the art and corresponding benefits of some of the various non-limiting embodiments may become further apparent upon review of the following detailed description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

In an example embodiment, a method for data management comprises determining a set of attributes related to an information resource at a first workspace location of a computing system, associating a first tag to the information resource based on a set of rules governing the set of attributes, and detecting an input of a set of inputs to initiate a control function that alters one or more attributes of the set of attributes. The method includes modifying the set of attributes with a set of control function attributes related to the control function in response to the detecting of the input, and associating a second tag to the information resource based on the modified set of attributes. The set of attributes can be used to define a level of restriction based on the set of rules to control the information resource differently at the first workplace and a second workplace. In addition, the method can further comprise analyzing data within the information resource to modify the set of attributes with a set of data attributes, and modifying the set of attributes with the set of data attributes in order to implement policies for different levels of restriction.

In another example embodiment, a computing device comprises an attribute component configured to dynamically determine a set of attributes corresponding to an information resource, a monitoring component configured to monitor a set of inputs corresponding to control functions received by the computing device, a tagging component configured to attach one or more tags to the information resource to control access to the information resource at different levels for different workspaces depending upon the set of attributes, and a policy component configured to associate a set of policies with the set of attributes determined at the different workspaces. The set of attributes include workspace attributes based on a source of the information resource, a workspace location at a creation or first receipt of the information resource and control function attributes that relate to modifying the information resource after the creation or first receipt.

In another example embodiment, a computer-readable storage medium comprises computer-readable instructions that, in response to execution, cause a computing device to perform operations, comprising determining a set of attributes related to an information resource being created on or first received by a first workspace. The set of attributes includes at least one location attribute, at least one channel attribute, and at least one source attribute that relates to the information resource. The operations further include generating a tag profile from a set of rules based on the set of attributes, generating an extension of the information resource with the tag profile, detecting an input of a set of inputs to initiate a control function that alters one or more attributes of the information resource, and modifying the set of attributes with a set of control function attributes related to the control function in response to the detecting of the input. The operations then update the tag profile based on the set of rules according to the set of attributes.

Other embodiments and various non-limiting examples, scenarios and implementations are described in more detail below.

BRIEF DESCRIPTION OF THE DRAWINGS

Various non-limiting embodiments are further described with reference to the accompanying drawings in which.

DETAILED DESCRIPTION

Overview

Figure 1:
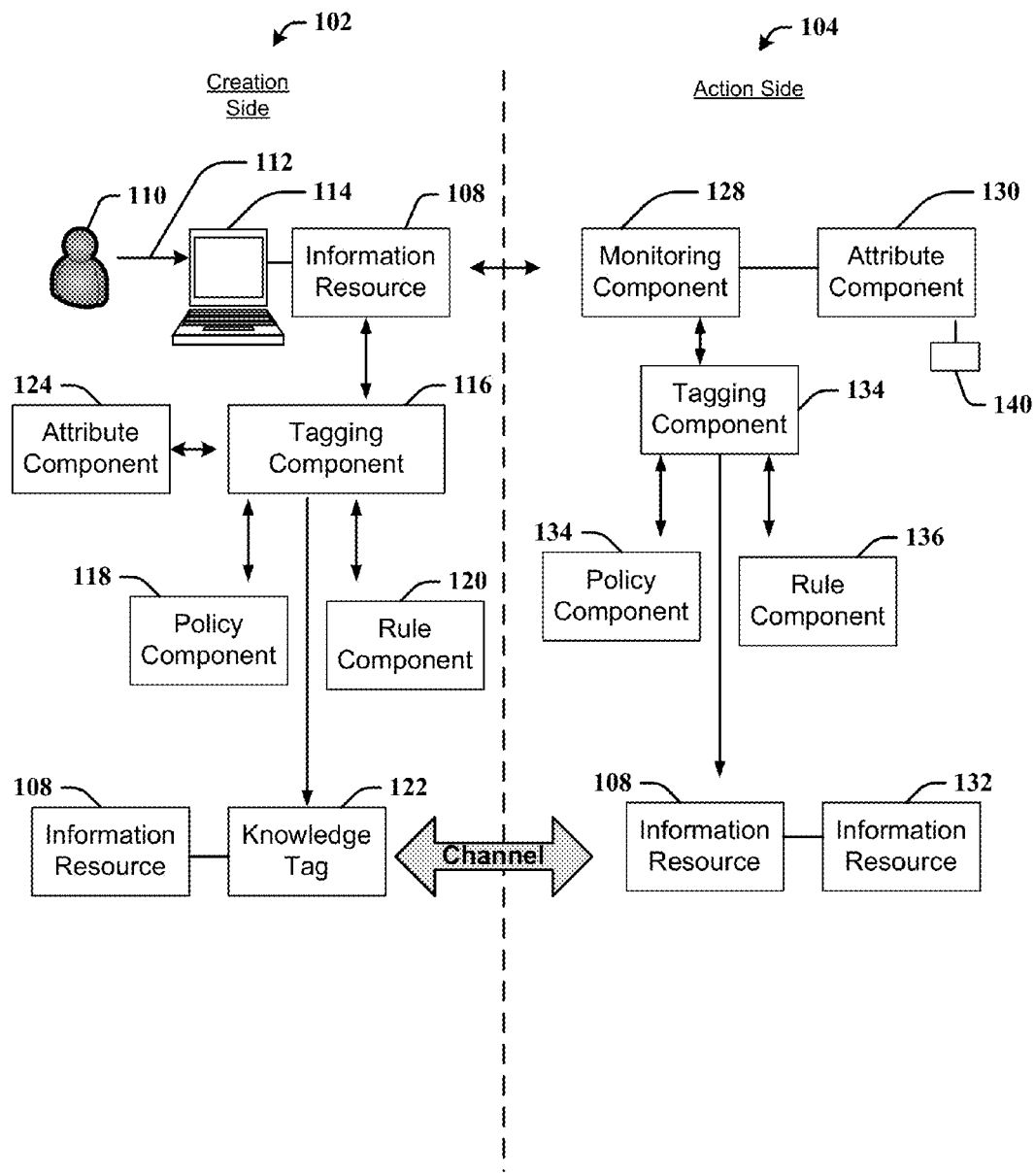
FIG. 1 is a block diagram illustrating exemplary systems according to various embodiments that can employ attributes, rules and policies in the handling of information resources.

As indicated in the background, any entity or person that values information obtained or created has a stake in keeping information in their control, which applicable even when data leaves a person's imminent control or has the potential to be acted on after leaving the workplace. For example, information allows for business strategic objectives. Information technology objectives and security, such as intrusion detection systems, extrusion detection systems, antivirus software, firewalls, information resource policy enforcement tools, audit tools, and virtual private networks (VPNs), etc., are to the efficient protection of systems that implement these objectives. Enterprises or corporations are driven by their information assets, which are valuable assets as information represents the know-how of the enterprise, business processes operate on information, and trusted relationships are maintained by information exchange.

Information and security services are linked directly to the information resource that represents the data to be protected. For example, a tagging component configured to attach one or more tags to the information resource to control access to the information resource at different levels for different workspaces depending upon the set of attributes determined at the different workspaces. A first workspace, for example, includes a corporate or employer workspace, in which a mixed use device (e.g., a smart phone or other mobile device) operates for corporate uses. A second workspace can include a personal workspace, in which the mixed use device also operates for personal uses. As the information resources are moved across workspaces, the information resources can have varying levels of access to enable a smooth transition for the user.

In one exemplary aspect of an embodiment, a method manages and protects data stored in a personal workspace and a corporate workspace. The method creates a tag (e.g., a knowledge tag) associated with any information or information resource that is being tracked to enable how a user can interact with the data, makes a decision by employing a policy to either trust the incoming request of a device or not to trust it, and applies an access restriction level (e.g., a lock symbol for a high business interest data item) over a view of data when data is inappropriate for a given context or labels the data as green or red. In other aspects, the method provides an ability to link to a session for accessing the data only if the user has trusted credentials. The method employs a policy component and a rules component for providing transparency between different workspaces about when a user is in compliance, out of compliance, or somewhere in a range, and further tags copyright or watermark data of information resources.

For instance, in one example, a tag component of a system in a cloud network, a server, an application or an operating system, for example, generates a tag profile from a set of rules based on a set of attributes related to an information resource. The set of rules are processed in a rules component that is operatively connected to a policy component that provides a policy designating a level of restriction from a set of policies with corresponding access restrictions to the tag profile. When the information resource is exported, communicated or copied to another location digital right management is applied by detecting the level of access restriction from the tag profile, which is attached to or otherwise integrated as an extension to the information resource.

An example of the system would be to secure a sensitive engineering document being distributed in an environment where the document's recipients could not necessarily be trusted, such as in a personal workspace as opposed to a corporate workspace (e.g., corporate network, corporate server connected session, corporate cloud structure, operating system or application on the corporate cloud or network). Alternatively, an e-mail could be secured with the policy component, so if the email is accidentally forwarded to an un-trusted party, only authorized users would gain access. The system does not necessarily limit the ability for information to be shared; rather rules are only enforced when attempts to gain access are at different workspaces than a corporate workspace, for example. Thus, sensitive information (e.g., information resources) can be shared with users who legitimately have access, and the tag profile can facilitate the easy request of access back to the business owners. In addition, offline use of the information resources allows for employees to create/access tagged documents having a high business interest or strict level of access restriction without needing network access for certain periods of time.

In the example above, access to the information resources is controlled by the tag component, the rules component, an attribute component and a monitoring component at levels of restriction that differs among the first workspace and a second workspace based on the policy from the set of policies corresponding to corporate workspaces and other personal workspaces. The components of the system operate to restrict access to each information resource by defining the level of restriction in the tag profile, and controlling access to the information resource with the tag profile. For example, if an email sends the information resource to another workspace location, the tag profile is attached with it in order for the employee mixed use device to implement policies within the tag or for other systems on other devices, in which the information resources becomes located at to also implement the same policies. A different workspace location can include, for example, a different directory path, a different network, a different computing system, or a different physical location than the original or corporate workspace.

Personal Space (Data) V. Corporate Space (Data)

FIG. 1 illustrates an exemplary system that protects data independently of underlying security infrastructure, and that operates functions and protocols that target appropriate data use at a data level. For instance, components and their operations are divided into a creation side 102 and an action side 104 according to a boundary 106, such as a time boundary. Both sides (the creation side 102 and the action side 104) delineate different points in the life of an information resource 108, such as a document, a digital image, a web page, etc. and the components that govern those points. The creation side 102 represents those components and associated functions of the system at the creation point of an information resource 108. For example, a document is created by a create document input on a corporate workspace or at a first receipt of the document via a communication shared, other network means, or through external media. The action side 104 represents those components and associated functions after creation and at each point where an action is performed to the information resource (e.g., a save input, a forward, upload, download, edit, move, copy to, print screen, copy and paste, printing, etc.), such as to control or manipulate data of the information resource.

At the creation side 102, at least one input 112, such as a create input, is received by a computer device 114 from a user 110 to create an information resource, or the information resource is first received across a network, cloud, from a memory location, directory path, etc. The information resource 108 (e.g., a corporate work template or document) is created in response to the create input or received from a communication channel. The information resource 108 contains data that could be in various forms or types of value to a corporate entity or an individual for personal use. The creation side 102 further includes a tagging component 116 for tagging different attributes among a set of attributes determined or modified over the life of the document, at creation and at any action manipulating the information resource after creation.

Exemplary systems can be configured to create and monitor the information resource 108, which can comprise data, such as digital, type data, graphical, etc., and can be configured to analyze and/or interpret the data in the information resource comprising information, about which various attributes can be determined based on the analysis and/or interpretation performed by an attribute component 124. Although the information resource 108 is discussed as being created by the input 112 from the user 110, the information resource 108, as discussed above, may also originate from a transmission channel. For example, an email transmission, portable storage device, or some other mechanism may have transferred the information resource to a workspace, such as a corporate workspace or a personal workspace from a personal device. Thus, the information resource 108, prior to being received by the computing device 114, can comprise one or more unknown or unassociated attributes that can be determined and/or associated with the data at or after creation or first receipt.

The information resource 108 can comprise attributes such as a timestamp designating a creation time, channel attributes regarding any information about a channel 126 that the information resource arrived or is transmitted to or from, source attributes such as a directory path in which it is stored or the application properties by which the information resource is created from, as well as attributes regarding the author, the author's credentials (e.g., log-in credentials), the type of data within the information resource 108 (e.g., type, graphical, numerical, subject nature, etc.), applications for access, the workspace generated at and the like. Other attributes are also envisioned and the examples herein are not meant to exhaust all attributes determined herein, and will be discussed in more detailed below (e.g., spatial information and/or other qualities such as version, source, destination, one or more potential uses or analyses intended, probability or fact of a causal relation to another item or set of the data collection, control function attributes, etc.) about the information resource 108.

The tagging component 116 is operatively connected to an attribute component 124 that determines the various attributes at the creation side 102 and at the action side 104, a policy component 118 and a rule component 120. Based on inputs from the attribute component 124, the policy component 118 and the rule component 120, the tagging component 116 attaches a set of attributes to the information resource in a tag 122, such as a knowledge tag or a tag profile.

The tag 122, for example, can be a knowledge tag profile that includes a meta-information that describes or defines some aspect of the information resource 108. The tag 122 includes more than traditional non-hierarchical keywords or terms. Rather, the tag 122 can include metadata that captures knowledge in the form of descriptions, categorizations, classifications, semantics, comments, notes, annotations, hyperdata, hyperlinks, or references that are collected in a profile, such as in a tag profile stored in the tag 122. The tag 122 includes information or attributes about the information resource 108 in order to control sharing away from the workspace (e.g., corporate workspace or personal workspace) based upon attributes of the information resource 108, policies of the workspace originating the information resource (e.g., the user or employee) regarding permissions and restrictions, and rules governing the attributes.

Different policies, for example, can be encoded in the policy component 118 and enacted based upon the different natures of the devices providing the resources for the information resource 108, settings provided by a user, or policies governing the corporate information technology departments. In particular, where, for example, the computing device 114 is a smart phone having multiple purposes and uses, a policy may correspond with greater scrutiny since the device 114 will potentially cross between the corporate workspace and the private workspace frequently. Other policies could indicate that the information resource 108 are tagged as a high business importance, based on the set of attributes determined by the attribute component 124, rules governing the policies and actions allowed to be taken with the information resource 108.

Eventually, the information resource 108 may be acted upon past the point of creation (the creation side 102) by some input of a set of inputs that controls certain control functions that manipulate or alter the information resource 108 further. For example, the information resource 108 could be manipulated by various control functions, such as being saved, edited beyond the original, moved, uploaded, emailed, published, sent, or any other actionable control function used to manipulate the data (e.g., save to, copy and paste, print screen, etc.). After creation, a monitoring component 128 monitors a set of inputs to determine whether attributes have changed, been added to or deleted in response to any control function inputs that may alter the information resource 108. In response to detecting these control functions, the monitoring component 128 can request the tag 122 to be updated to reflect the actions that have changed, edited or manipulated the information resource 108. For example, a history of actions could be recorded within the tag 122.

For example, in response to the user 110 conducting an action or control, such as moving, editing, saving, etc. with the information resource 108 the attribute component 130 on the action side 104 modifies or further determines a set of attributes related to the control function performed. For example, attributes that may be further modified in the set of attributes includes time of last entry, time of save, last action performed, where last saved, where previously saved, etc.

Each new and old attribute is collected and stored within a set of attributes by the attribute component 130. Accordingly, as the information resource 108 is altered, saved, moved, changed, transmitted, etc. throughout the life of the document, security at different workplaces can also be modified. Some attributes may not be applicable to implementing a security protocol that is high, for example. In some cases, when an attribute changes, such as being saved at a new directory path (e.g., a corporate secure workspace), the security level or restriction level attached to the information resource 108 may be changed such as with a second tag 132, which can be an upgraded tag that is attached to the information resource 108. Alternatively, the security level or restriction level may be lessened depending upon a number of variables governing policy, policy rules, and the attributes of the information resource at any given time, or location on a device or network.

Other configurations of the system are also envisioned and the present disclosure is not limited to any one particular configuration. For purposes of discussing an ordering of components and associated processes, the creation side 102 and the action side 104 are delineated. Similar to the creation side 102, the action side 104 further includes the attribute component 130, a tagging component 134, a policy component 135, and a rule component 136 that operatively communicate to enable security at the data level with knowledge tags that follow the information resource 108 dynamically throughout the digital life of the information resource 108. These components can comprise hardware and/or software provided by the operating system, applications, a network or cloud streaming and the like.

In one embodiment, the tag 122 and the tag 132 include a tag profile that comprises attributes determined by the attribute components 124, 130, and further includes policies of the policy components 118, 135 to restrict access to the information resource 108 independent of the location of the information resource 108. For example, a location could be a physical location that is determined from a global positioning system (GPS) device 140 or other geographical locating mechanism. Alternatively, the location of the information resource 108 could vary according to a directory path. For example, the information resource 108, after creation or origination from a communication channel, is saved by an input that is generated on the action side 104. Upon detecting that the information resource 108 has been acted on (e.g., a save to), the monitoring component 128 detects the save input and communicates with the attribute component 130 to reconfigure or further determine or populate the set of attributes in order to accurately reflect the attributes in an upgrade (e.g., a file path or directory path change or physical location change).

In another embodiment, the rules in the rules components 120, and 136 are also encapsulated in the tag 122, 132 or a knowledge tag profile that is continuously modified and updated to reflect both past actions and attributes, but also illustrate current attributes, which could be used for a later policy at a later action (e.g., edit, save, move, send, upload, download, etc) taken towards the information resource 108, or be used for a current policy implementation by the policy component 118, and 135.

The rule components 120 and 136 are configured to implement various sets of rules for different functions. In one example the rule components 120 and 136 are configured to implement a set of rules for the attribute component 124 to select various attributes for policy consideration or encoding in the tag 122, 132. For example, some attributes may be of such small concern, such as what font the information resource 108 contains in cases where the information resource 108 comprises a word document or a typed resource to be accessed. Other attributes that relate to the type of applications use to access the information resource 108 or a set of data attributes related to the kind of data and applications for the type of data, as well as copyrighted material or sections to be watermarked may be of relevant importance to the corporate policies.

The rule components 120 and 136 are also configured to implement a set of rules for the policy component to determine a level of restriction. For example, a set of frame based logic, or rule based logic may contain various "If, then," or "if, and, then" statements and the like that encode weight according to a range of a metrics for different attributes. These weights can include any scale from 1 to 10, for example, decimal points, binary limits and the like that can then be communicated to the policy components 118 and 135 to determine a level of access restriction based on a set of policies. The weighting can be configured based on an averaging or other means to attach importance to attributes of the information resource 108.

In another embodiment, the tag 122 and the tag 132 comprise the same knowledge tag with a different profile over time. In other words, the tag 132 includes the same profile information related to the information resource 108 as the tag 122, but could have additional attributes or different attributes considered by the rules in the rules component 136. As stated above, the tag 132, for example, may include the set of attributes, the set of policies and the set of rules or results contained by the tag 122, and each set could follow in the history of the profile encapsulated by the knowledge tag 132. The tag 132 is thus upgraded to record pertinent attributes throughout the life cycle of the information resource 108. Attributes, policies and rules determined or modified from previous locations (e.g., different physical or digital pathways), could be saved in a breadcrumb view within the profile of the knowledge tag 122, for example.

While not all attributes, policies, and rules may be fully encapsulated in the tag 122, 132, certain the fundamental ones, as determined by corporate policies may become inherent as an extension in order to not lose the original intent of the creator for restricting access. For example, where an information resource originates on a network or a workspace that considers information created on zones or file locations designated as the corporate workspace with high security, the policies for the information resource 108 may be fixed within the knowledge tag 122, 132 in order to maintain the particular access restrictions attached to the data of the information resource 108, regardless of being transported, communicated, published, shared, or otherwise used for other uses than residing in a file path of the corporate network.

Figure 2:
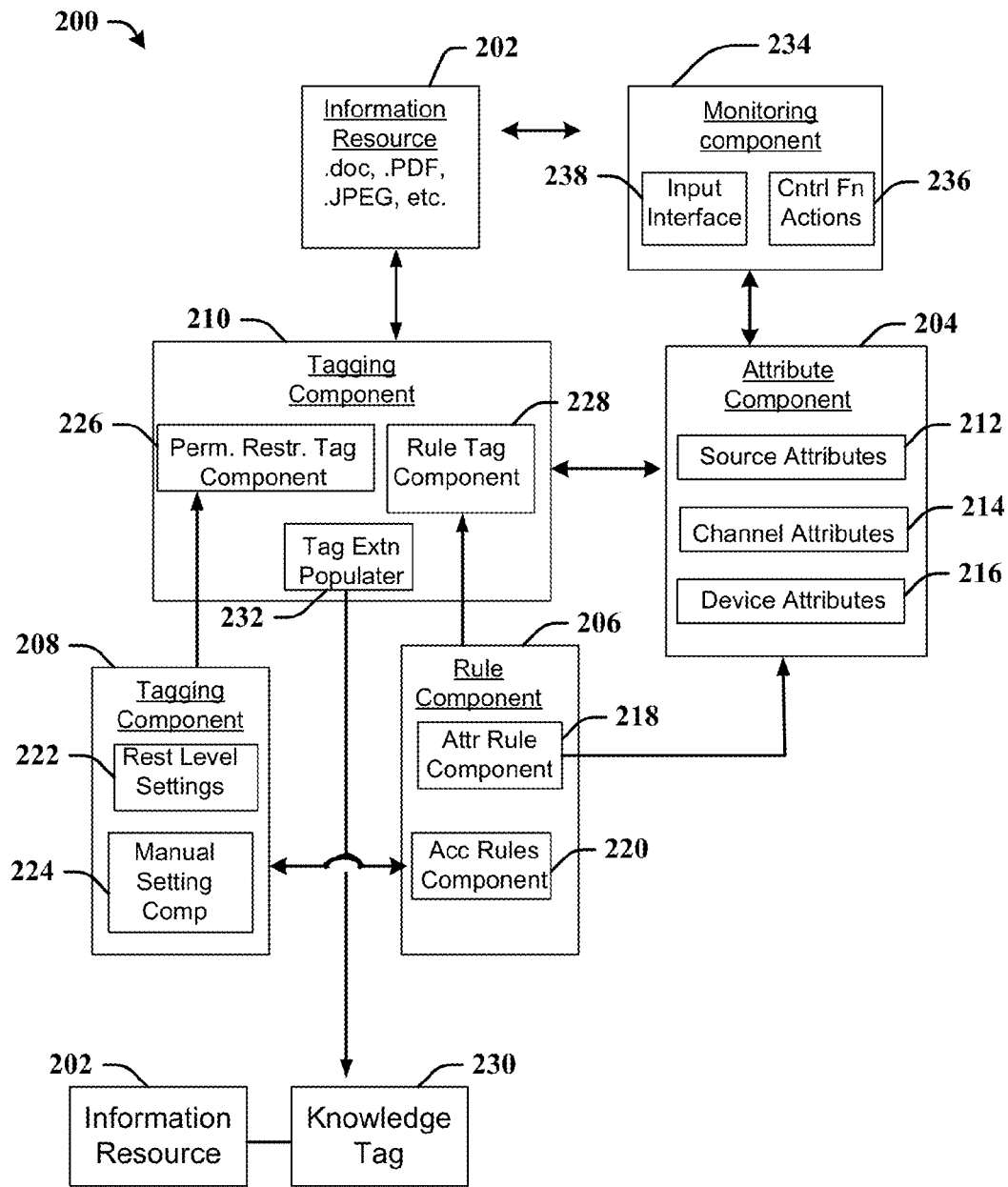
FIG. 2 is a block diagram illustrating exemplary systems according to various embodiments that can employ attributes, rules and policies in the handling of information resources.

Referring now to FIG. 2, illustrates an exemplary system 200 that manages and protects an information resource 202. The information resource 202 can reside on a network cloud, a server, a database or a memory at a directory or file path, in which it was created or stored after being communicated, such as by email, external drive or other computer storage media. The information resource 202 is any digital information having data that may be of value to an owner of the system or memory where the information resource 202 resides. For example, the information resource 202 could be a Word document, a digital picture, a JPEG, TIFF, PDF, or other file or document type having a filename extension applied to indicate specific encoding or file format of the contents or usage.

The system 200 includes an attribute component 204, a rule component 206, a policy component 208, and a tagging component 210 that are operatively connected to one another to provided security to the information resource 202 at the data level so that access restrictions and policies dynamically update and follow with the information resources of a corporate workspace. As a result, the information resource 202 is sharable with employee work-home devices (e.g., smart phones, laptops, etc.), which are used at work and elsewhere outside of work, without losing security to the information resource 202 regardless of the location and provide a seamless security to the data of the information resource 202. The system 200, for example, may reside at an operating system level, in conjunction with or as a file manager system that provides a user interface to work with file systems. Alternatively, a server or a cloud network could host the system 200 to protect each information resource according to different attributes, rules and policies that integrate with each information resource regardless of a location. The cloud network, for example, could provide the system 200 as an application stream in a certain protocol (e.g., HTTP, CIFS, RTSP, etc.). In another embodiment, the system could be encapsulated in a fully virtualized application and executed as if it were fully installed on each device interfacing with a corporate workspace having corporate data.

The policy component 208 includes a restriction level setting component 222 and a manual setting component 224. The policy component 208 summarizes regulations that are addressed in access security to the information resource 202 with a tag profile 230. For instance, the restriction level setting component 222 defines how the information resource 202 is controlled and protected through defined classifications according to what purpose, ability to be shared, conditions for sharing, location for storage, timeframes for storing, safeguarding levels, subset security for information within the information resource 202, distortion levels of the data or watermarking of the data and the like.

The policy component 208 summarizes business or corporate policies of information resources on the devices or systems operating on the corporate network or cloud structure. Policies and regulations are described in a set of policies and procedures for different information resource classes, for example. The corporate policies and regulations are expressed in the restriction level access component 222. For example, user obligations, levels of access and definitions can be controlled and set in the restriction level access component 222. For example, metrics, such as key risk indicators or the like are capable of defining that the information resource 202 is of high business impact or subject to a risk that meets, exceeds or is subject to a probability threshold to a risk as defined in the restriction level access component, as well as weight certain attributes. The policy component 208 is configured to define classifications for the information resource, such as high business impact, advisable, moderate, or low levels of risk and associate levels of security or risk to the restriction level settings component 222 to implement access controls or settings or communicate the levels of security within a tag profile 230. Other different classifications or settings are also envisioned and can be implemented in various ways, such as providing an encryption lock to the information resource 202 for high levels of access.

In one embodiment, the policy component provides a color indication to the document of being a high risk (red) and communicate that a higher level of restriction is associated with the information resource 202, than levels requiring less restrictions to access. The restrictions, for example, provide locks based on the color indications (e.g., green, yellow, red) that lock the data from being acted upon, such as printed, uploaded, transmitted, re-located, edited, print-screened, other control functioning inputs and the like. A lower level of restriction, for example, may allow personal sharing through emailing, relocating, uploading, reading, editing as well as other manipulation of the information resource. The policy component 208 includes a manual settings component 224 that provides manual settings to be entered and weighted by the corporation policy or the IT departments, for example, such as by a key risk indicator. The policy component 208 including the restriction level settings component 222 and the manual settings component 224 are operationally connected to identify the overall information resource governance for a corporate workspace and distinguish levels of corporate information assets with personal levels of access on a device, such as a smart phone or other work-home device, for example.

The rules component 206 is communicatively connected to the policy component 208 and the attributes component 204, and is configured to provide logical rules governing the policy component 208 and the attribute component 208. The rules component 206, for example, includes an access rules component 220 that governs indicators (e.g., key risk indicators) for the policy component 206 to factor in to the policies for information resources on the corporate workspace (e.g., corporate network, cloud, server, devices, etc.). Information resource classifications and policy rules are encoded in information resource rules processed according to the access rules component 220. For example, information resources can be classified according to ownership (e.g., employee credentials, workspace, etc.), origin (e.g., source), and location.

The attribute rule component 218 is configured to provide rules for determining and classifying attributes related to the information resource 202. Rules for classifying attributes according to device, communication channels, origination or sources of the information resource 202 are communicated to the attributes component 204, which, in turn, determines attributes related to the classifications. Attributes of the information resource 202 are thus classified according to predetermined criteria, which may be provided by the corporate owner, or other personal owner of the information resource. The information resource 202 has a defined ownership, such as the corporate workspace, and data otherwise in-between or not wholly owned by the corporate workspace is designated as such. The ownership, for example, is usually expressed in the business purposes, in the case of corporate ownership.

The attribute component 204 of the system 200 determines and modifies the membership of a set of attributes related to information resources present on a workspace or corporate workspace according to data rules of the rule component 206. Each workspace may include a memory location, such as a zone of memory or a network database, or a network database managed by a server for a corporate workplace. Employees may be provided credentials to log-in or otherwise access the business workspace environments through their computing devices. A personal workspace, for example, may include a file or directory that allows a user or employee to gather various source code files and resources to work with, which may further include a software application that provides comprehensive facilities to computer users for development. In either case, a workspace acts as an environment where a user can work, isolated from external components for the duration of a task.

The attribute component 204 dynamically determines a set of attributes depending upon the environment of the information resource 202 and based on the rules received from the attribute rule component 218 of the rule component 206. The set of attributes include source attributes 212 that are based on workspace attributes of the information resource 202, such as application type being used to open, create or save the information resource, location data related to the file space or directory path, in which the information resource is saved to, a temporal attribute (e.g., a time stamp), authorship (e.g., the user and user credentials used to access or create the information resource), a version attribute (e.g., Word 2003), a network location, storage location, a relation to other information resources, a prospective use of the information resource, and the like. In other words, the source attributes 212 determined by the attribute component 204 describe the information resource 202 according to the data's origination (e.g., Google apps, Word, some other application, a work SharePoint, website, etc.), such as with a Uniform Resource Locator (URL). In addition, the source attributes 212 include descriptors or descriptions of who owns the data, such as the credentials used to access the system supporting, storing or allowing creation of the information resource (e.g., an employee credential, job title, security level of the user, etc.). Further, source attributes 212 can include the entity or corporate identification that controls the data or may have legal rights to the data created on the device.

The attribute component 204 is further configured to determine a set of channel attributes 214 and a set of device attributes 216. The set of channel attributes 214 includes attributes or characteristics related to the data used to communicate the information resource 202, such as in a digital bit stream (e.g., from a sender). For example, header information is determined in the set of channel attributes 214 that includes supplemental data (e.g., the sender or recipient's IP address, the protocol governing the payload format and other formats, etc.) that is often placed at the beginning of information resources or the payload, which is stored or transmitted when the information resource 202 is received from a network, external server, etc.

The device attributes 216 are also modified by the attribute component 204 to include characteristics related to the device that received or otherwise created the information resource 202. For instance, device attributes can include the device name used on the network that downloaded, received, created, or stored the information resource. A time of creation, device network address, device status, operating system, applications used for the information resource 202, name of a job associated with the device, link type, origin node name, the device system identification, and the like may be attributes determined by the attribute component 204 and dynamically modified in the set of device attributes 216 throughout the life of ownership or of the information resource 202 itself.

As the information resource 202 becomes shared or otherwise communicated, the set of device attributes 216 is dynamically upgraded or modified to reflect attributes of shared devices that also change, as with the set of source attributes 212 and the set of channel attributes 214, for example. Thus, attributes related to the information resource 202 determined in the set of source attributes 212, the set of channel attributes 214 and the set of device attributes 216 is dynamically upgraded based on the current status, location, device and person communicating or controlling the information resource 202 (e.g., spatial information and/or other qualities such as version, source, destination, one or more potential uses or analyses intended, probability or fact of a causal relation to another item or set of the data collection, etc.).

The policy component 208, the rule component 206 and the attribute component 204 communicate their respective outputs to the tagging component 210, which creates the tag profile 230 and attaches the tag profile 230 to the information resource 202 as an integrated set of properties or extension(s). For example, a permissions restriction tag component 226 receives policies to set or encapsulate according to the policy component 208. Levels of restrictions set according to policies in the policy component 208 are determined to be tagged by the permissions restriction tag component 226 according to various mechanisms, such as locks, masks, color labels and the like, for example, which are then communicated to a tag extension populater 232 of the tagging component 210.

The tagging component 210 further comprises a rule tag component 228 that further determines the rules and attributes in which the rules apply and communicates each to the tag extension populater 232. The knowledge tag profile then becomes populated by the tag extension populater 232 and integrated with the information resource 202.

In one embodiment, the system 200 further includes a monitoring component 234 that comprises a control function action mechanism 236 and an input interface 238. The monitoring component 234, for example, is communicatively coupled to the attribute component 204 and is configured to monitor a set of control function inputs at the input interface 238. The set of inputs monitored include any input that provides an action or enacts a control function toward the information resource, such as a save as, saving to, sending, uploading, downloading, editing, further tagging, etc. The monitoring component 234 is configured to observe accesses to the information resource 202 and allow authorization to perform the inputs provided by a user based on the policy incorporated within knowledge tag profile 230.

Figure 3:
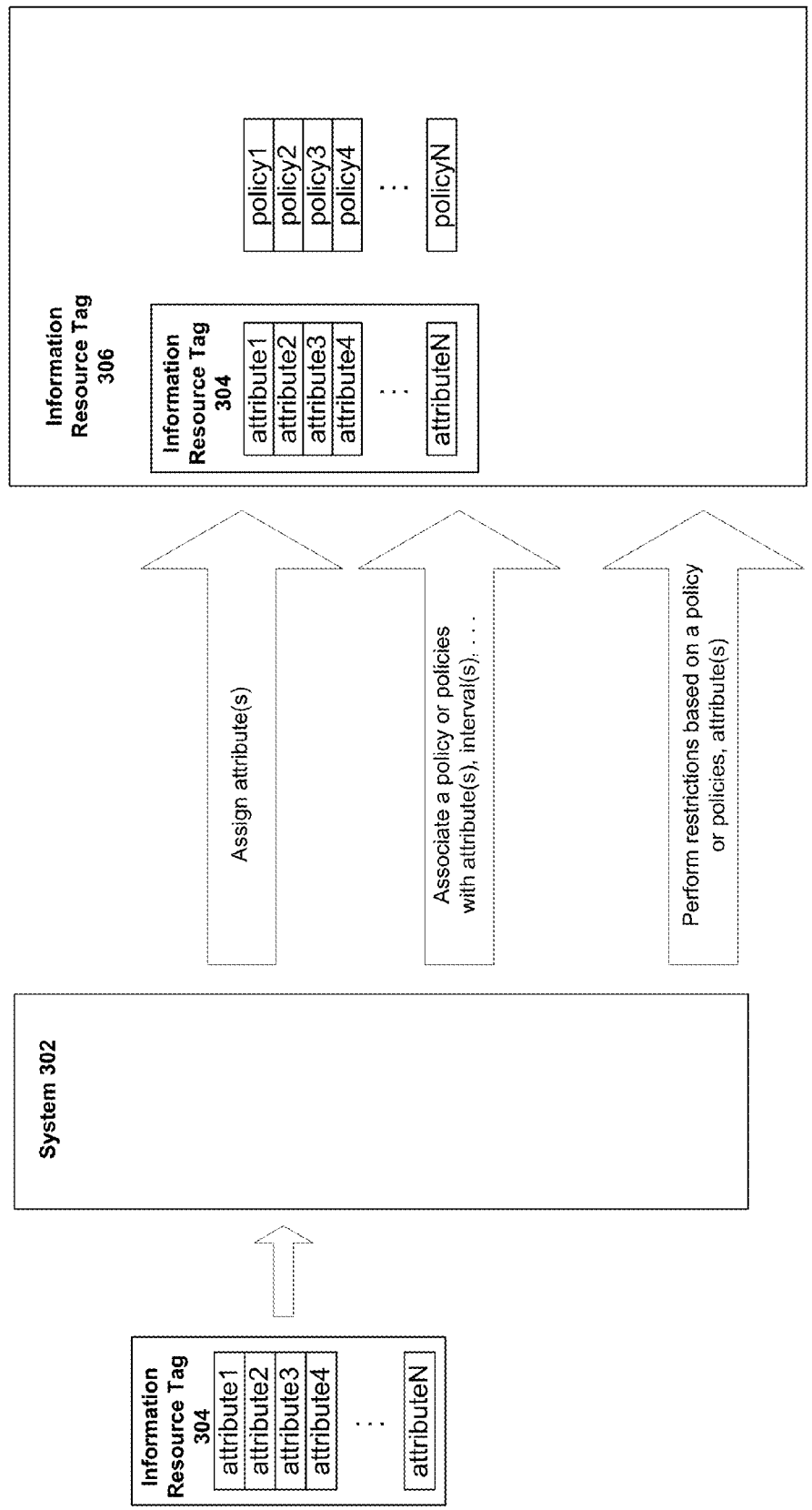
FIG. 3 is a block diagram illustrating exemplary systems according to various embodiments that can employ attributes, policies, and restrictions in the handling of information resources.

FIG. 3 illustrates exemplary aspects of exemplary systems 302 that can be further configured to determine, create, and/or associate one or more policies related to attributes with the information resource. In a non-limiting embodiment, exemplary systems 302 can facilitate attaching significance to an information resource (e.g., policies associated with attributes that allow an information resource copy in the past or a different location to be lower ranked based upon personal preferences, the specification of a personal ranking system, weighting of historical data, etc.), which can facilitate weighting data so it can become less relevant to subsequent analyses, and so on. In a further non-limiting example, various embodiments can enable the attachment of temporal significance to an information resource to facilitate weighting historical data as it ages so it can become less relevant to query results, and so on. In yet other non-limiting embodiments, policies related to one or more attributes with the information resource can be employed by exemplary systems 302 to facilitate attribute organization, attribute retention, attribute collocation, creating indices, creating statistical or other summaries, and so on, etc.

For instance, in still further non-limiting embodiments, exemplary systems 302 can be configured to perform various operations on information resources including further analyses, interpretation, and inference, determining relationships between attributes such as possibility, probability, causality, and so on, creating and associating further policies, data organization, data retention, data collocation, creating indices, creating statistical or other summaries, and so on, etc., by employing information resource attributes, interval, and/or policies. Thus, FIG. 3 depicts information resource tag 306 comprising information resource tag 304 as well as any attributes that are determined and/or assigned or associated with information resource tag 304, any computed and/or assigned intervals, and/or determined, created, and/or associated policies related to intervals and/or attributes.

Note that while FIG. 3 depicts the information resource tag 306 as comprising a one to one correlation between attributes and policies (e.g., each attribute shown with a corresponding policy), the subject application is not so limited. For instance, policies can concern more than one attribute and or interval and any combination. Thus, exemplary systems 302 can flexibly and dynamically analyze data, attributes, and intervals, can create policies, and can facilitate performing unstructured operations and analyses thereon, whereas conventional systems such as vector clocks and temporal databases would be limited by their inherent rigid structural specifications.

As a result the information resource tag 304 received by exemplary systems 302 can be enriched according to various aspects of the subject application to facilitate dynamically creating insights into attributes of information resources and relationships therein, perform stream analysis, perform root cause analysis, generate trust-based results, data organization, aging, and retention, creating inferences from big data streams, and so on. Further note that while the information resource tag 306 is depicted as comprising the information resource tag 304 and corresponding attributes and policies, various embodiments of the subject application are not so limited. In other words, further non-limiting embodiments can associate attributes, intervals, policies, and so on by appending or modifying such information into the data or otherwise (e.g., tracking by means of a file system, database system, data management rights system, etc.).

As a non-limiting example, in a social networking analysis regarding data concerning a user's friends, a user can be interested in updates that have happened recently. However, updates that are relatively old data are typically treated with the same priority as regards storage and retention as the new updates (e.g., only the presentation aspects of new data are given priority). In a further non-limiting example regarding analysis and correlation of financial stock trends, the user can be interested in recent developments and updates concerning a stock, to the exclusion of developments more remote in time. For example, while a historical Form 10-K annual report for a company is conventionally disregarded in the presentation of stock price data, recent news developments concerning litigation against the company, can restore relevance of the historical 10-K in the analysis of stock price data trends. As a further illustration, flat representation of temporal attributes would typically treat the historical Form 10-K data as a file perhaps having a timestamp, and which may even have a conventional temporal interval associated with it of one year or one quarter (e.g., until the next update). However, it is clear that litigation attributes of the data (e.g., parties and subject of the litigation, type of litigation, etc.) can have a longer event horizon, and thus a longer temporal significance or relevance than simple financial attributes of the historical Form 10-K data. In addition, data concerning a recent news story that names the same parties, subject of the litigation, or type of litigation can be causally connected or of great relevance to and/or change the significance of the historical Form 10-K data in the context of reviewing stock price trend data. Accordingly, various embodiments of subject application facilitate accounting for such disparate and changing significance of different attributes and enable the creation of policies for various functions (e.g., collocating data, creating indices over data, aging the impact of data out of the data collection, and so on, etc.) that conventional systems have heretofore failed to consider.

In one non-limiting example, in determining whether events are causally related versus merely correlated, exemplary systems can employ intervals such as temporal intervals to determine the possibility of causal relationships, correlations, and so on. For instance, for two pieces of data or events occurring sequentially in time, e.g., a precedent and an antecedent, the precedent and antecedent can be correlated or uncorrelated. In addition, the precedent can be causally related to the antecedent (e.g., the precedent is the cause of the antecedent), but the antecedent cannot be the cause of the precedent, because the precedent occurs prior in time, or prior in the temporal interval than the antecedent. Accordingly, in various non-limiting embodiments, exemplary systems can employ intervals such as temporal intervals to determine causal relationships in addition to correlations, and so on, as described herein. In a similar manner regarding physical proximity of data or information resources in space, two pieces of data or events occurring sequentially in time may be precluded from having a causal relationship due to a lack of physical proximity. Thus, the subject application can advantageously facilitate distinguishing between causal relationships and correlations as described above.

In a non-limiting of exemplary embodiments, attributes and intervals regarding temporal can employ a simple linear ordering in time such that vector clock systems can be used, such that inferences can be made from this vector clock time not rather than absolute clock time or some similar notion such as system clock time. In other exemplary embodiments other notions of time can be employed, such as relative time based on a sequence of events (e.g., treating data as a sequence of events that can be causally related), GPS clock time, etc. In addition, such notions of time can be employed to create inferences such as Bayesian inferences to update uncertainty associated with data (and predictions or inferences) in a probability model, according to a further non-limiting aspect.

Thus, in non-limiting embodiments, exemplary systems 302 can dynamically generate or learn temporal intervals (e.g., as the data or events come into the system, etc.) of relevance for data or events, for such purposes as determining causality as described above. It can be understood that time data, such as timestamps, like spatial data, such as GPS coordinates, are generally considered fixed values or hard values that are relatively absolute in relation to associated data or events. However, temporal intervals of relevance can be highly dependent upon a number of factors. As a further illustration, temporal intervals of relevance can be dependent upon non-limiting factors including usage or intended usage of the data or event, the user or users of the data or event, the environment of the data or event (e.g., geospatial location of the data or event), etc.

In other non-limiting embodiments, exemplary systems 302 can generate or learn temporal intervals for causality purposes over time. Thus, in various embodiments, for an event or data, rather than simply being time stamped when it came into the system, exemplary systems can dynamically determine (e.g., via a temporal Bayesian network, etc.) temporal intervals such as how long to remember that the data or event holds (e.g., the probability of the data or event remaining true, remains in adherence to a temporal interval based policy, etc.) based on the type of analysis. For example, as described above, an observation or analysis related to information resource attributes or events can become less precise overtime, such that the desire for retention or inclusion of the data or event related to the observation or analysis becomes less desirable.

In addition, as further described above, different attributes of the data or events can have different timelines over which the attributes age (e.g., the significance of the attribute or associated data become less relevant over time compared to other attributes or data). Thus, in further non-limiting embodiments, exemplary systems can employ the dynamically determined temporal intervals for other purposes such as (e.g., data organization, reorganization, restriction access and/or retention on size limited devices or components such as disk storage, memory, etc.). Accordingly, exemplary systems 302 can automatically tune themselves to remember data or events and/or attributes, intervals, and/or policies for a predetermined period of time (e.g., according to a temporal interval based policy, according to intended, predetermined, and/or inferred prospective uses or analyses, according to determined and/or inferred relationships with other data or events, etc.).

It is noted that, while the above assumes that the initial location-based data is simply updated with a new workspace or location-based data point, it can also be that, based on inferences made by exemplary systems 302, a location attribute is updated for the location-based data due to understanding of relations with information resource tag 306 or other data.

The same applies to discussions of attributes relating to source of data (e.g., data source, number of sources, number of sources that affirm or disaffirm an inference, etc.) within the discussion of confidence in data. An initial data point of the information resource tag 304 or information resource tag 306 can have a source attribute and can have device attributes, channel attributes, data attributes and the like associated with it. Confidence in the attributes of the data can depend on an initially presumed reliability. Confidence in the data, source attribute, and the like can depend on such things as the passage of time (e.g., firms go out of business, people switch cell phones, URLs (uniform resource locators) can change, etc.). In addition, further data from new sources can reaffirm or disaffirm data, the relative numbers of which can impact, not only confidence in the data itself, but also inferences drawn therefrom, source attributes of the initial data point, intervals, and confidence therein. Thus, if there are many affirming data sources, it may be desired to unequally weight data from a particular source to accomplish data organization, policy retention for access restrictions, data analysis, and so on. Thus, various embodiments of the subject application can employ weighting functions, for example, to facilitate weighting of information resource attributes (e.g., down-weighting of aged data, etc.) according to various policy considerations and attributes related to information resources.

Figure 4:
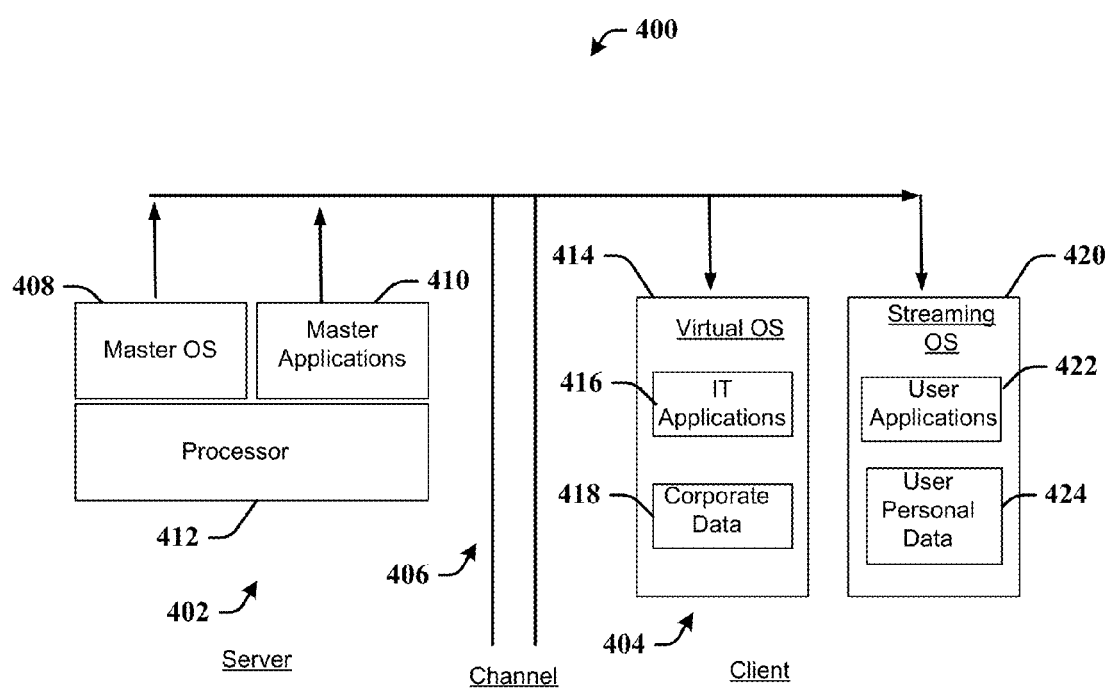
FIG. 4 is a block diagram illustrating exemplary systems, according to further non-limiting aspects.

Referring to FIG. 4, an exemplary system 400 is illustrated to enable security at a data level. As discussed above, information resources shared among different locations and with mixed use devices, such work-home devices (e.g., smart phones, laptops, etc.) are shared with security integrated into each information resource. For example, corporate data is separated from personal data to enable different levels of restriction to access the information resource in order to make both accessible from multiple device platforms.

A server 402 and a client 404 are communicatively coupled across a network channel 406 for applications and data to be synchronized. When connected to the server 402, an operating system 408 and applications 410 are updated and processed with a processor 412. The operating system 408 and applications 410 are virtualized and streamed to the client 404. For example, applications are encapsulated and portions of the application's code, data and settings are delivered when client devices needed them, instead of a complete application being delivered before the startup of the client 404.

In one example, the exemplary system 400 dynamically enables applications available to users to define data of an information resource and policies controlling how the data is used. The system 400, for example, includes the server 402 where software and data for a corporate business are stored. The network channel 406 provides delivery of applications such as from a cloud network where the provisioning of dynamically scalable and virtualized resources (e.g., the operating system 408 and applications 410) are communicated and synchronized. The client 404 receives a virtualized operating system 414, applications 416 and user data 418. Additionally, a personal virtualized operating system 420 with user applications 422 and user personal data 424 is encapsulated in separate containers either on a client device, such as a mixed use work-home device (e.g., corporate smart phone), or on a personal cloud. The corporate data 418 is thus stored securely in a corporate container, for example, and managed in accordance with the corporate policies, which can be identified for each information resource within a tag profile, as discussed above.

Figure 5:
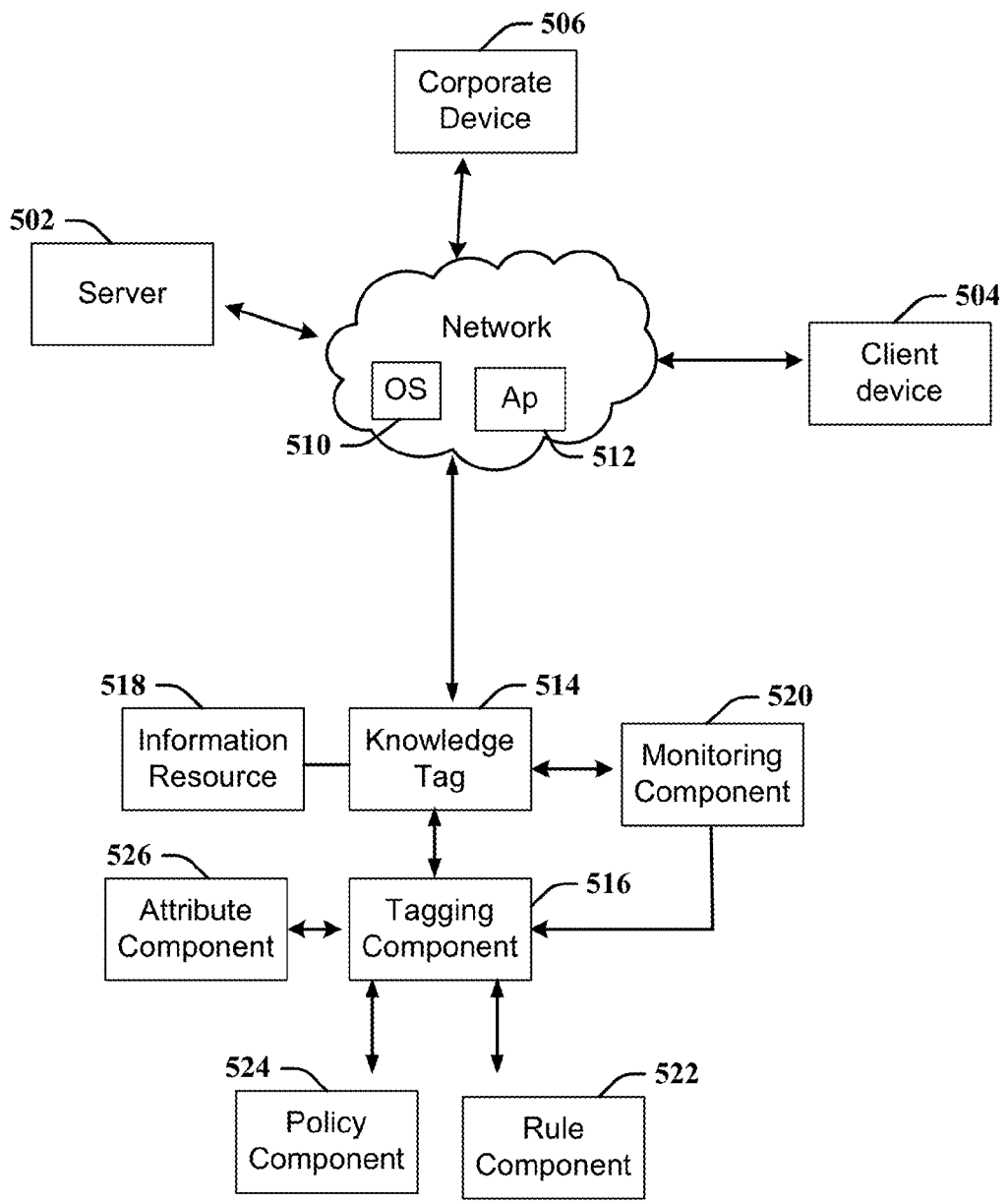
FIG. 5 is a block diagram illustrating exemplary systems, according to further non-limiting aspects.

Referring to FIG. 5, is another exemplary system 500 that includes a corporate server 502 that synchronizes corporate data and services with a client device 504 and a corporate device 506. Users can be provided corporate data and services along with personal data and services to a mix of devices from a cloud network 508. An operating system 510 and applications 512 can differentiate between data items and data of an information resource 518 (e.g., Word document for home versus Word document for work). In this regard, a same or similar application has different versions depending on a corporate workspace or a personal workspace. A tag component 516 having location capability such as with a GPS or other location information can facilitate determinations of categories of use as part of the context the application uses to make decisions about information resources, for example. Information resources are treated differently, for example, depending on the source of the information resource 518, a user, and a device operating on a workspace.

The information resource 518 is attached with a knowledge tag 514 according to the tag component 516. A rules component 522, a policy component 524, a monitoring component 520, and an attribute component 526 operate synergistically to provide access restrictions to the information resource 518 through the knowledge tag 514. The monitoring component 520 monitors changes made and observes accesses to the information resource 518. The policy component 524 in turn determines whether policies allow or deny a certain operation based on a data category, which is classified according to attributes determined in the attribute component 526. The rules component provides rules for attributes determined and classifies the data according to source attributes, device attributes and channel attributes associated with the information resource 518.

In one embodiment, the knowledge tag 514 of the information resource 518 is dynamically altered as the data is altered or the workspace changes. For example, where the information resource is emailed to different domains, the policy component 524 could determine that the information resource 518 is personal or corporate and provide appropriate access restrictions based on the domains. These access restrictions can then be encapsulated within the knowledge tag 514 of the information resource 518 upon attachment or upload.

Exemplary system 500 can be further configured to determine, create, and/or associate one or more policies related to one or more attributes with the data. In a non-limiting embodiment, exemplary system 500 can facilitate attaching significance to data (e.g., policies associated with attributes that allow data in the past or a different location to be lower ranked based upon personal preferences, the specification of a personal ranking system, weighting of historical data, etc.), which can facilitate weighting data so it can become less relevant to subsequent analyses, and so on via an algorithm, such as a Fuzzy logic or Fuzzy means algorithm. In a further non-limiting example, various embodiments can enable the attachment of temporal significance to data to facilitate weighting historical data as it ages so it can become less relevant, and so on. In yet other non-limiting embodiments, policies related to one or more attributes with the data can be employed by exemplary systems 500 to facilitate data organization, data retention, data collocation, creating indices, creating statistical or other summaries, and so on, etc. within the knowledge tag 514.

Figure 6:
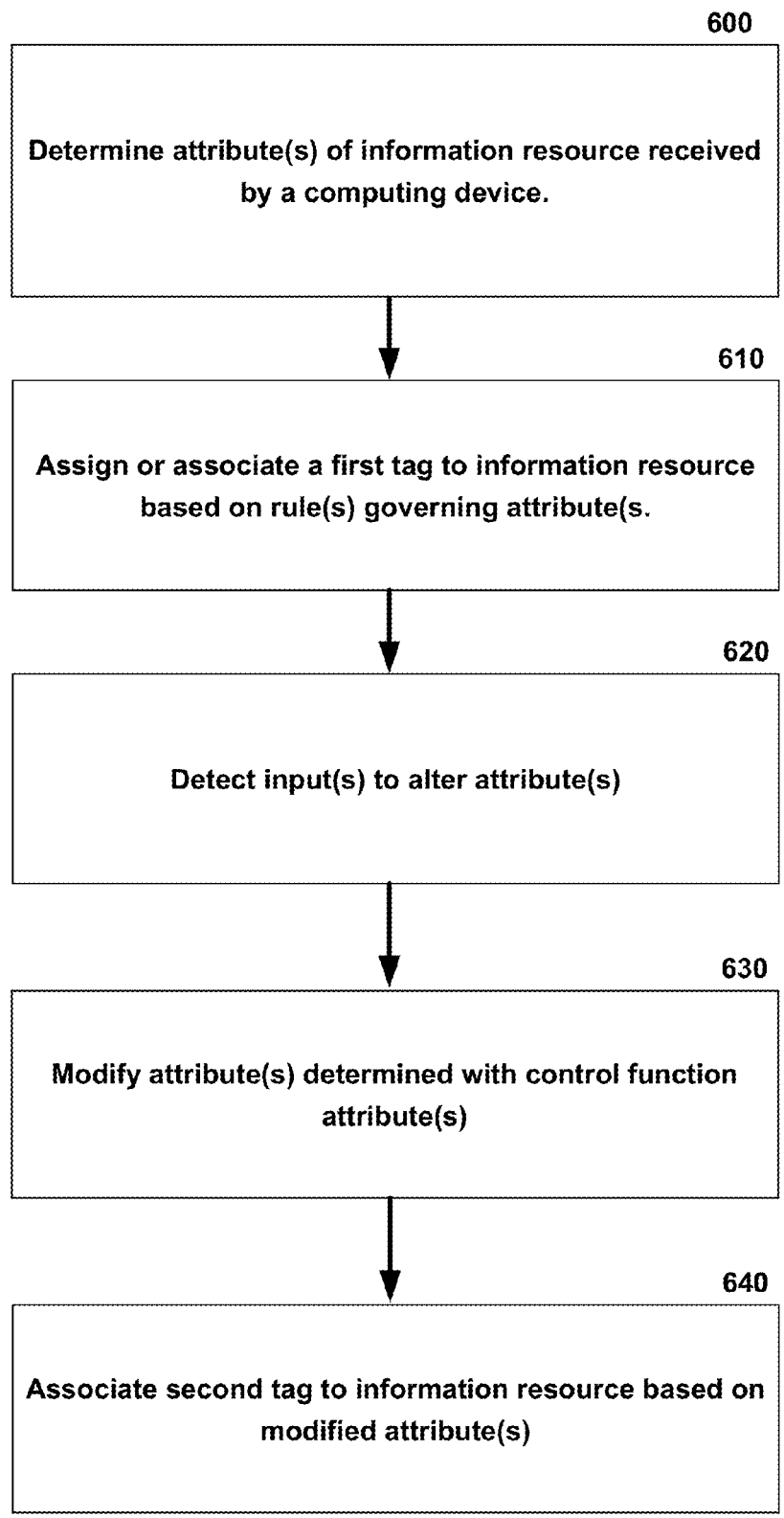
FIG. 6 is a flow diagram illustrating a non-limiting process for data management in an embodiment.

FIG. 6 is a flow diagram illustrating a non-limiting process for data management in an embodiment. For example, at 600, an information resource received by a computing device or system is analyzed or interpreted to determine a set of attributes related to the information resource at a first workspace location. For example, the one or more attributes of the information resource can include previously unknown or undetermined attributes of the source, channel and device associated with the information resource, as described above. At 610, a first tag, such as a knowledge tag or a tag profile is assigned to or associated with the information resources. The tag has one or more attributes based on a set of rules. The rules, as described above, determine how and what attributes are determined, as well as what policies are implemented based on the attributes. As described above, the one or more attributes of the information resource can include a temporal attribute, a spatial attribute, a version attribute, a network location, an Internet Protocol address, a source of the data, a destination of the data, a relation to other data, or a prospective use of the data, as well as other attributes described herein.

At 620, a set of inputs that initiate control functions altering one or more attributes of the information resource are detected. For example, a save to, move, edit, copy and paste, upload, attach, print screen, etc. are detected. At 630, the set of attributes is modified with a set of control function attributes related to the input to one or more control functions detected. The set of attributes is updated based on the editing or controls that manipulated or changed the information resource, for example. At 640, a second tag is associated to the information resource based on the modified set of attributed.

Exemplary Networked and Distributed Environments

One of ordinary skill in the art can appreciate that the various embodiments for data management described herein can be implemented in connection with any computer or other client or server device, which can be deployed as part of a computer network or in a distributed computing environment, and can be connected to any kind of data store. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the mechanisms for data management as described for various embodiments of the subject disclosure.

Figure 7:
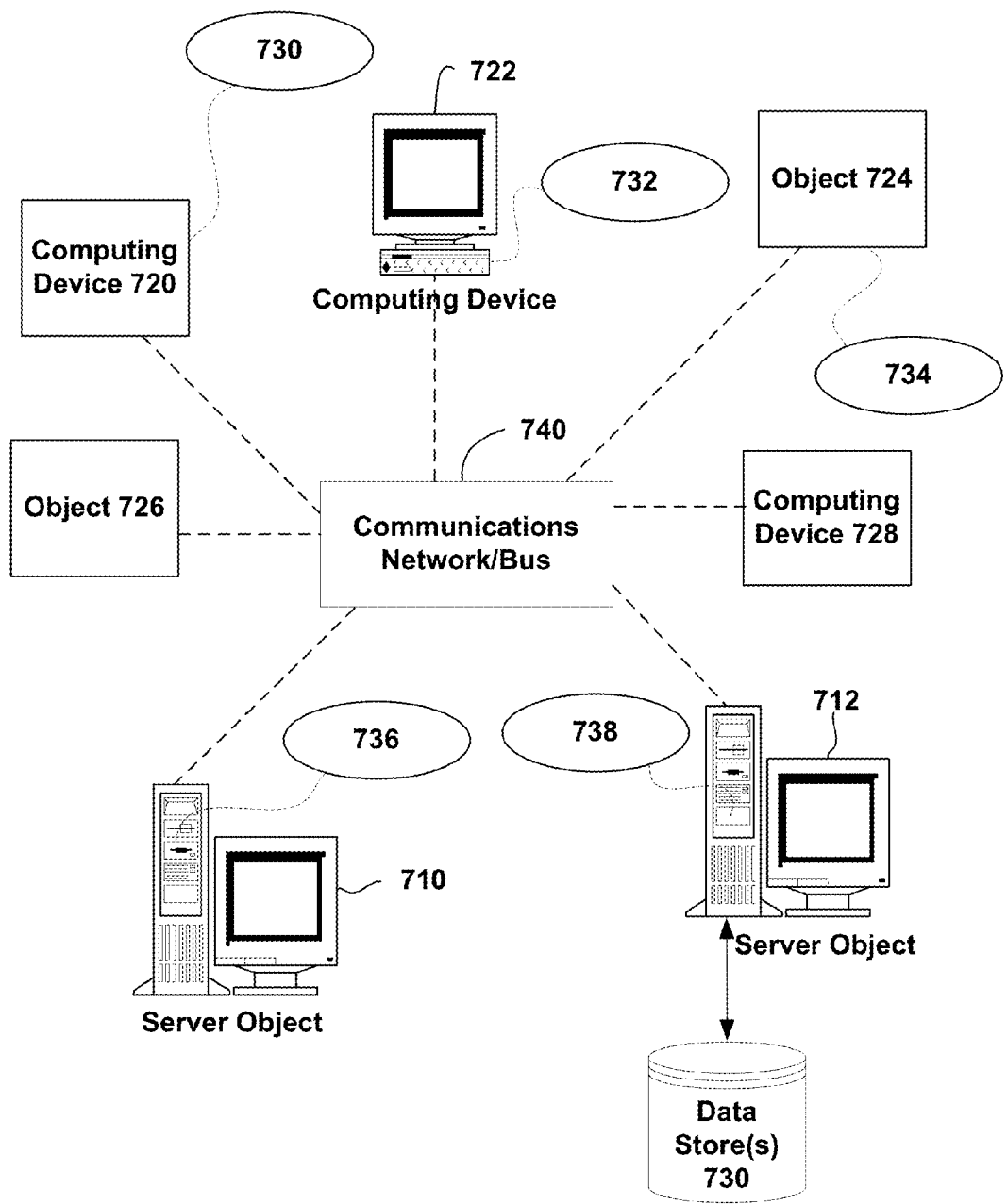
FIG. 7 illustrates a flow diagram showing an exemplary non-limiting implementation for a recommendation system for recommending credit worthiness of a client in accordance with various aspects described herein.

FIG. 7 provides a schematic diagram of an exemplary networked or distributed computing environment. The distributed computing environment comprises computing objects 710, 712, etc. and computing objects or devices 720, 722, 724, 726, 728, etc., which may include programs, methods, data stores, programmable logic, etc., as represented by applications 730, 732, 734, 736, 738 and data store(s) 740. It can be appreciated that computing objects 710, 712, etc. and computing objects or devices 720, 722, 724, 726, 728, etc. may comprise different devices, such as personal digital assistants (PDAs), audio/video devices, mobile phones, MP3 players, personal computers, laptops, etc.

Each computing object 710, 712, etc. and computing objects or devices 720, 722, 724, 726, 728, etc. can communicate with one or more other computing objects 710, 712, etc. and computing objects or devices 720, 722, 724, 726, 728, etc. by way of the communications network 742, either directly or indirectly. Even though illustrated as a single element in FIG. 7, communications network 742 may comprise other computing objects and computing devices that provide services to the system of FIG. 7, and/or may represent multiple interconnected networks, which are not shown. Each computing object 710, 712, etc. or computing object or devices 720, 722, 724, 726, 728, etc. can also contain an application, such as applications 730, 732, 734, 736, 738, that might make use of an API, or other object, software, firmware and/or hardware, suitable for communication with or implementation of the techniques for data management provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems for data management as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 7, as a non-limiting example, computing objects or devices 720, 722, 724, 726, 728, etc. can be thought of as clients and computing objects 710, 712, etc. can be thought of as servers where computing objects 710, 712, etc., acting as servers provide data services, such as receiving data from client computing objects or devices 720, 722, 724, 726, 728, etc., storing of data, processing of data, transmitting data to client computing objects or devices 720, 722, 724, 726, 728, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network 742 or bus is the Internet, for example, the computing objects 710, 712, etc. can be Web servers with which other computing objects or devices 720, 722, 724, 726, 728, etc. communicate via any of a number of known protocols, such as the hypertext transfer protocol (HTTP). Computing objects 710, 712, etc. acting as servers may also serve as clients, e.g., computing objects or devices 720, 722, 724, 726, 728, etc., as may be characteristic of a distributed computing environment.

Exemplary Computing Device

As mentioned, advantageously, the techniques described herein can be applied to any device where it is desirable to perform data management in a computing system. It can be understood, therefore, that handheld, portable and other computing devices and computing objects of all kinds are contemplated for use in connection with the various embodiments, i.e., anywhere that resource usage of a device may be desirably optimized. Accordingly, the below general purpose remote computer described below in FIG. 8 is but one example of a computing device.

Although not required, embodiments can partly be implemented via an operating system, for use by a developer of services for a device or object, and/or included within application software that operates to perform one or more functional aspects of the various embodiments described herein. Software may be described in the general context of computer-executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol should be considered limiting.

Figure 8:
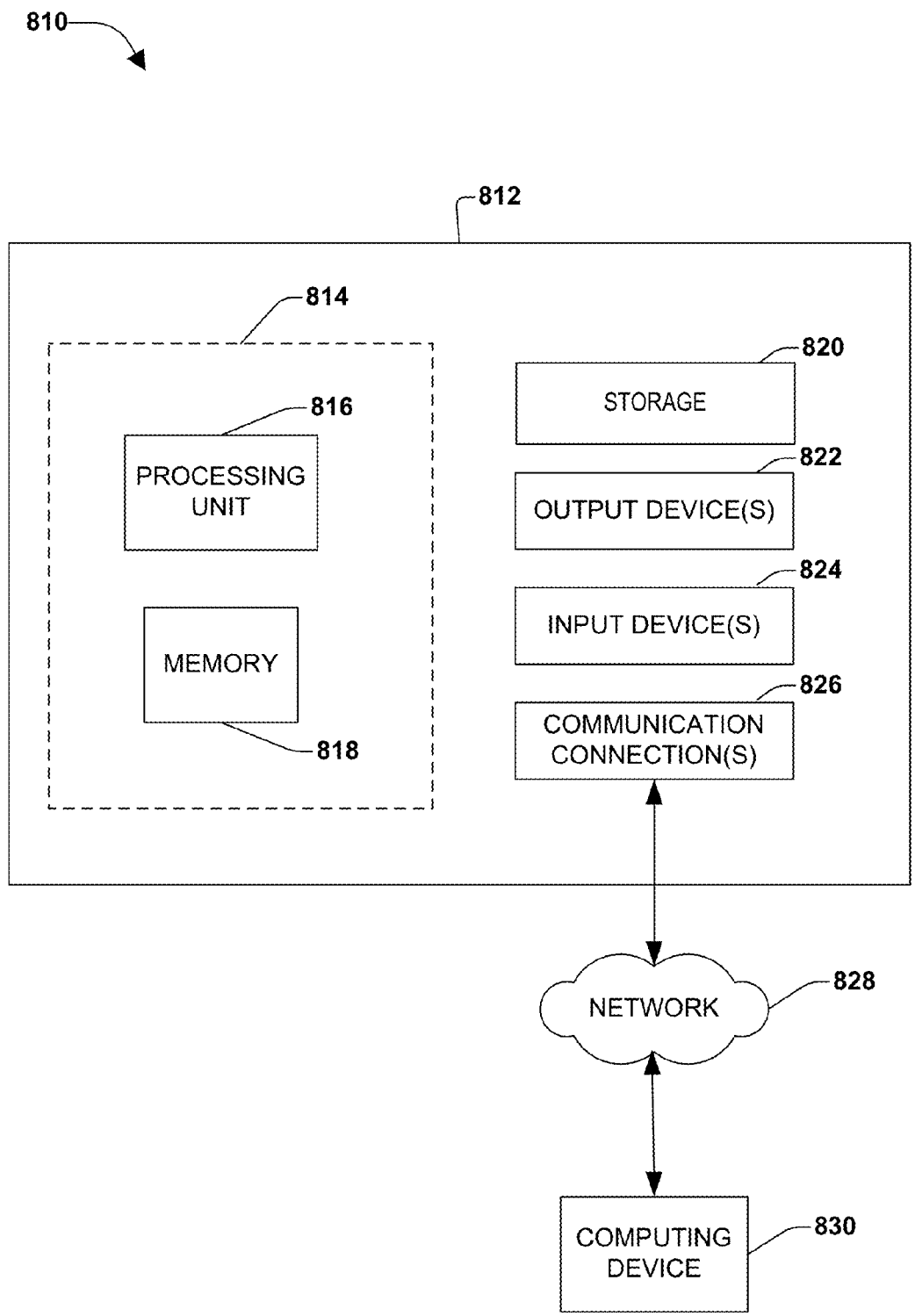
FIG. 8 is a block diagram representing exemplary non-limiting networked environments in which various non-limiting embodiments described herein can be implemented.

FIG. 8 and the following discussion provide a brief, general description of a suitable computing environment to implement embodiments of one or more of the provisions set forth herein. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 810 comprising a computing device 812 configured to implement one or more embodiments provided herein. In one configuration, computing device 812 includes at least one processing unit 816 and memory 818. Depending on the exact configuration and type of computing device, memory 818 may be volatile (such as RAM, for example), non-volatile (such as ROM, flash memory, etc., for example) or some combination of the two. This configuration is illustrated in FIG. 8 by dashed line 814.

In other embodiments, device 812 may include additional features and/or functionality. For example, device 812 may also include additional storage (e.g., removable and/or non-removable) including, but not limited to, magnetic storage, optical storage, and the like. Such additional storage is illustrated in FIG. 8 by storage 820. In one embodiment, computer readable instructions to implement one or more embodiments provided herein may be in storage 820. Storage 820 may also store other computer readable instructions to implement an operating system, an application program, and the like. Computer readable instructions may be loaded in memory 818 for execution by processing unit 816, for example.

The term "computer readable media" as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 812. Any such computer storage media may be part of device 812.

Device 812 may also include communication connection(s) 826 that allows device 812 to communicate with other devices. Communication connection(s) 826 may include, but is not limited to, a modem, a Network Interface Card (NIC), an integrated network interface, a radio frequency transmitter/receiver, an infrared port, a USB connection, or other interfaces for connecting computing device 812 to other computing devices. Communication connection(s) 826 may include a wired connection or a wireless connection. Communication connection(s) 826 may transmit and/or receive communication media.

The term "computer readable media" as used herein includes computer readable storage media and communication media. Computer readable storage media includes volatile and nonvolatile, removable and non-removable media implemented in any method or technology for storage of information such as computer readable instructions or other data. Memory 818 and storage 820 are examples of computer readable storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1012. Any such computer readable storage media may be part of device 812.

Device 812 may also include communication connection(s) 826 that allows device 812 to communicate with other devices. Communication connection(s) 826 may include, but is not limited to, a modem, a Network Interface Card (NIC), an integrated network interface, a radio frequency transmitter/receiver, an infrared port, a USB connection, or other interfaces for connecting computing device 812 to other computing devices. Communication connection(s) 826 may include a wired connection or a wireless connection. Communication connection(s) 826 may transmit and/or receive communication media.

The term "computer readable media" may also include communication media. Communication media typically embodies computer readable instructions or other data that may be communicated in a "modulated data signal" such as a carrier wave or other transport mechanism and includes any information delivery media. The term "modulated data signal" may include a signal that has one or more of its characteristics set or changed in such a manner as to encode information in the signal.

Device 812 may include input device(s) 824 such as keyboard, mouse, pen, voice input device, touch input device, infrared cameras, video input devices, and/or any other input device. Output device(s) 822 such as one or more displays, speakers, printers, and/or any other output device may also be included in device 812. Input device(s) 824 and output device(s) 822 may be connected to device 812 via a wired connection, wireless connection, or any combination thereof. In one embodiment, an input device or an output device from another computing device may be used as input device(s) 824 or output device(s) 822 for computing device 812.

Components of computing device 812 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 812 may be interconnected by a network. For example, memory 818 may be comprised of multiple physical memory units located in different physical locations interconnected by a network.

Those skilled in the art will realize that storage devices utilized to store computer readable instructions may be distributed across a network. For example, a computing device 830 accessible via network 828 may store computer readable instructions to implement one or more embodiments provided herein. Computing device 812 may access computing device 830 and download a part or all of the computer readable instructions for execution. Alternatively, computing device 812 may download pieces of the computer readable instructions, as needed, or some instructions may be executed at computing device 812 and some at computing device 830.

Figure 9:
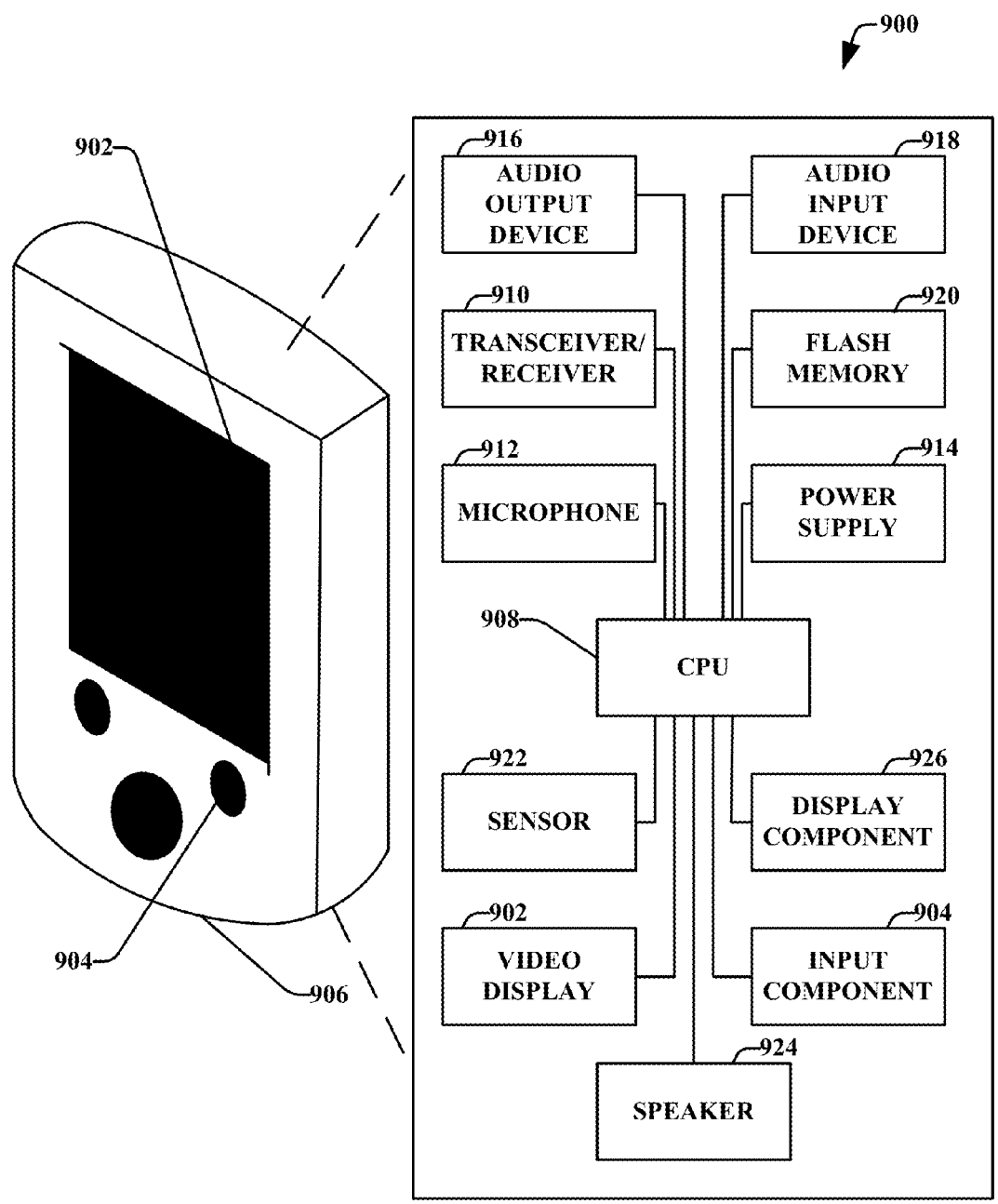
FIG. 9 is a block diagram representing an exemplary non-limiting computing system or operating environment in which one or more aspects of various non-limiting embodiments described herein can be implemented.

FIG. 9 is an exemplary portable electronic device, for example, a Personal Data Assistant (PDA) 900 comprising a video display 902, an input component 904, a housing 906, a CPU 908, a transceiver and/or a receiver 910, a microphone 912, a power supply 914, an audio output device 916, an audio input 918, flash memory 920, various sensors 922, and speaker(s) 924. The flash memory 920 utilizing dual bit and single bit memory devices manufactured with an improved buffering system and hybrid arbitration mechanism to improve read/write performance and provide low latency for mobile systems reduce reliability and density by an x decoding circuit capable of reducing the number of sector selects per sector and accessing a particular core sector by concurrently providing an accessing voltage and an inhibiting voltage, per the present invention. The audio input device 918 can be a transducer, for example. The input component 904 can include a keypad, buttons, dials, pressure keys, and the like. The video display 902 can be a liquid crystal display, a plasma display, an LED display, and the like, for displaying visual data and information. In accordance with another embodiment of the claimed subject matter, the portable device with flash memory 920 manufactured according to the present invention, comprises cell phones, memory sticks, flash drive devices, video camcorders, voice recorders, USB flash drives, fax machines, flash memory laptops, MP3 players, digital cameras, home video game consoles, hard drives, memory cards (used as solid-state disks in laptops), and the like. The flash memory 920 can include random access memory, read only memory, optical memory, audio memory, magnetic memory, and the like.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Figure 10:
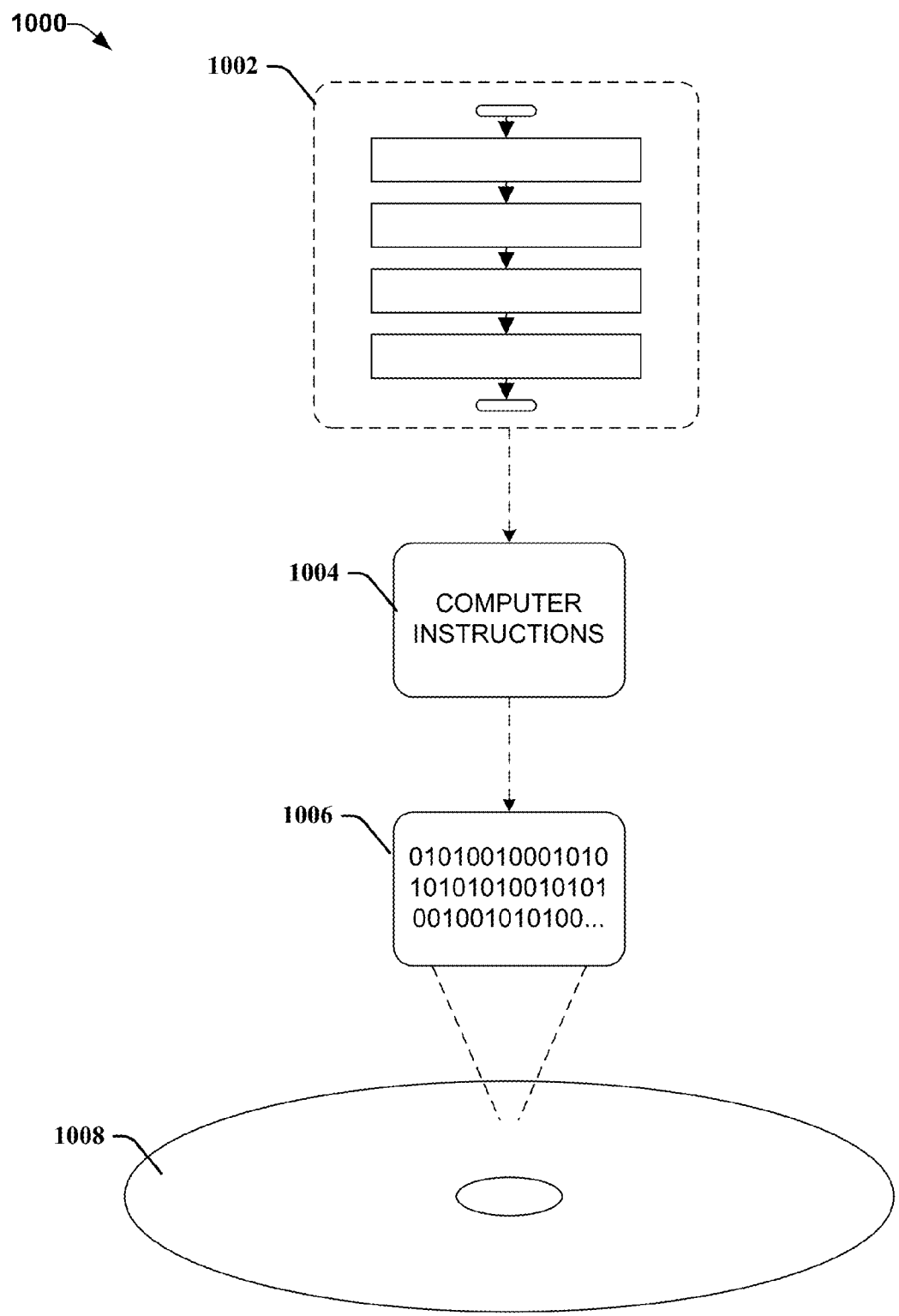
FIG. 10 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 10, wherein an implementation 1000 comprises a computer-readable medium 1008 (e.g., a CD-R, DVD-R, or a platter of a hard disk drive), on which is encoded computer-readable data 1006. This computer-readable data 1006 in turn comprises a set of computer instructions 1004 configured to operate according to one or more of the principles set forth herein. In one such embodiment of the implementation 1000, the processor-executable instructions 1004 may be configured to perform a method, such as the exemplary methods disclosed herein, for example. In another such embodiment, the processor-executable instructions X may be configured to implement a system, such as the exemplary systems herein, for example. Many such computer-readable media may be devised by those of ordinary skill in the art that are configured to operate in accordance with the techniques presented herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method implemented in a mixed use device having at least one processor, the method comprising:
    determining a set of attributes related to an information resource at a first workspace of the mixed use device, the mixed use device having at least two workspaces, each workspace associated with a different usage of the device by a user;
    associating a first tag to the information resource based on a set of rules governing the set of attributes, the first tag used, in part, to define a level of restriction to control the information resource in the first workspace;
    detecting an input to initiate a control function applied to the information resource that alters one or more attributes of the set of attributes;
    modifying the set of attributes with a set of control function attributes related to the control function in response to the detecting of the input; and
    associating a second tag to the information resource based on the modified set of attributes, the second tag used to define a level of restriction based on the set of rules to control the information resource differently at the first workspace than at a second workspace.

2. The method of claim 1, further comprising:
    analyzing data within the information resource to modify the set of attributes with a set of data attributes; and
    modifying the set of attributes with the set of data attributes.

3. The method of claim 1, wherein the determining the set of attributes comprises determining at least one of a temporal attribute, a spatial attribute, a version attribute, a network location, an Internet Protocol address, a source of the information resource, a destination of the information resource, a relation to other information resources, or a prospective use of the information resource.

4. The method of claim 1, further comprising:
    monitoring a set of inputs that initiate the control function that alters the one or more attributes of the information resource, including monitoring at least one of attachment inputs, printing inputs, saving inputs, sending inputs, or editing inputs that respectively initiate manipulation of the information resource.

5. The method of claim 1, wherein the associating the first tag includes assigning at least one first policy from a set of policies with the first tag to control access to the information resource at the first workspace, and the associating the second tag to the information resource includes assigning at least one second policy from the set of policies with the second tag to control access to the information resource at a second workspace.

6. The method of claim 5, further comprising:
    restricting the information resource at a level of restriction that differs among the first workspace and the second workspace based on the at least one first policy from the set of policies or the at least one second policy from the set of policies.

7. The method of claim 6, wherein the restricting the information resource includes disabling the information resource with the first tag or the second tag from control with the set of inputs, according to the first workspace and the second workspace.

8. The method of claim 6, wherein the restricting the information resource includes defining the level of restriction in the first tag and in the second tag, and controlling access to the information resource with the level of restriction after sending the information resource to the second workspace that includes at least one of a different directory path, a different network, a different computing system or a different geographical location than the first workspace.

9. A computing device, comprising:
    a memory having computer executable components stored thereon; and
    a processor communicatively coupled to the memory, the processor configured to facilitate execution of the computer executable components, the computer executable components comprising:
    an attribute component configured to determine a set of attributes corresponding to an information resource dynamically, wherein the set of attributes include workspace attributes based on a source of the information resource, a first workspace at a creation or first receipt of the information resource, and control function attributes that relate to modifying the information resource after the creation or first receipt;
    a monitoring component configured to monitor a set of inputs corresponding to control functions received by the computing device that alter one or more attributes of the set of attributes of the information resource;
    a tagging component configured to attach one or more tags to the information resource to control access to the information resource at different levels for different workspaces depending upon the set of attributes determined at the different workspaces; and a policy component configured to associate a set of policies with the set of attributes determined at the different workspaces, wherein the computing device has at least two workspaces, each workspace associated with a different usage of the device by a user.

10. The computing device of claim 9, wherein the policy component is configured to assign a policy from the set of policies to a tag to control access to the information resource.

11. The computing device of claim 10, further comprising:
a rule component configured to provide a set of rules based on the set of attributes of the information resource that is defined according to the tag attached to the information resource.

12. The computing device of claim 11, wherein the tagging component is further configured to define the tag according to the policy from the set of policies and the set of attributes, wherein the policy provides a level of restriction to the information resource based on the set of attributes determined at the first workspace, and to further define the tag with a different policy from the set of policies that provides a different level of restriction in response to the set of attributes dynamically changing or increasing ether at a second workspace or at the first workspace.

13. The computing device of claim 12, wherein the first workspace includes at least one of a corporate directory path that the information resource is created at or a physical location determined by a global positioning component of the computing device, and the second workspace includes at least one of a different directory path or a different physical location that the information resource is located.

14. A computer-readable storage device comprising computer-readable instructions that, in response to execution, cause a computing device to perform operations, comprising:
determining a set of attributes related to an information resource being created on or first received by a first workspace, wherein the set of attributes includes at least one location attribute, at least one channel attribute, and at least one source attribute that relates to the information resource;
generating a tag profile from a set of rules based on the set of attributes;
generating an extension of the information resource with the tag profile;
detecting an input of a set of inputs to initiate a control function that alters one or more attributes of the information resource;
modifying the set of attributes with a set of control function attributes related to the control function in response to the detecting the input; and
updating the tag profile based on the set of rules according to the set of attributes,
wherein the computing-readable storage device has multiple workspaces, each workspace associated with a different usage of the computing device by a user,
wherein the generating the tag profile includes generating a definition that defines a level of restriction based on the set of rules to control the information resource differently at a first workspace and a second workspace, the first workspace including a corporate workspace and the second workspace including a personal workspace.

15. The computer-readable storage device of claim 14, the operations further comprising:
analyzing data within the information resource to modify the set of attributes with a set of data attributes; and
modifying the set of attributes with the set of data attributes;
wherein the determining the set of attributes comprises determining at least one of a temporal attribute, a spatial attribute, a version attribute, a network location, an Internet Protocol address, a source of the information resource, a destination of the information resource, a relation to other information resources, or a prospective use of the information resource, and wherein the at least one location attribute includes at least one of a directory path or a geographical location based on a geo-positioning input of the information resource.

16. The computer-readable storage device of claim 14, wherein the generating the tag profile from the set of rules based on the set of attributes includes providing a policy designating a level of restriction from a set of policies with corresponding access restrictions to the tag profile according to the first workspace.

17. The computer-readable storage device of claim 16, the operations further comprising:
restricting access to the information resource at the level of restriction that differs among the first workspace and a second workspace based on the policy from the set of policies corresponding to the first workspace and the second workspace.

18. The computer-readable storage device of claim 17, wherein the restricting access to the information resource includes defining the level of restriction in the tag profile, and controlling access to the information resource with the level of restriction after sending the information resource to the second workspace that includes at least one of a different directory path, a different network, a different computing system, or a different physical location than the first workspace.

* * * * *